Sept. 13, 1966 A. M. SACKLER 3,271,879
BRAIN AND NERVOUS SYSTEM MODEL
Filed March 2, 1964 2 Sheets-Sheet 1
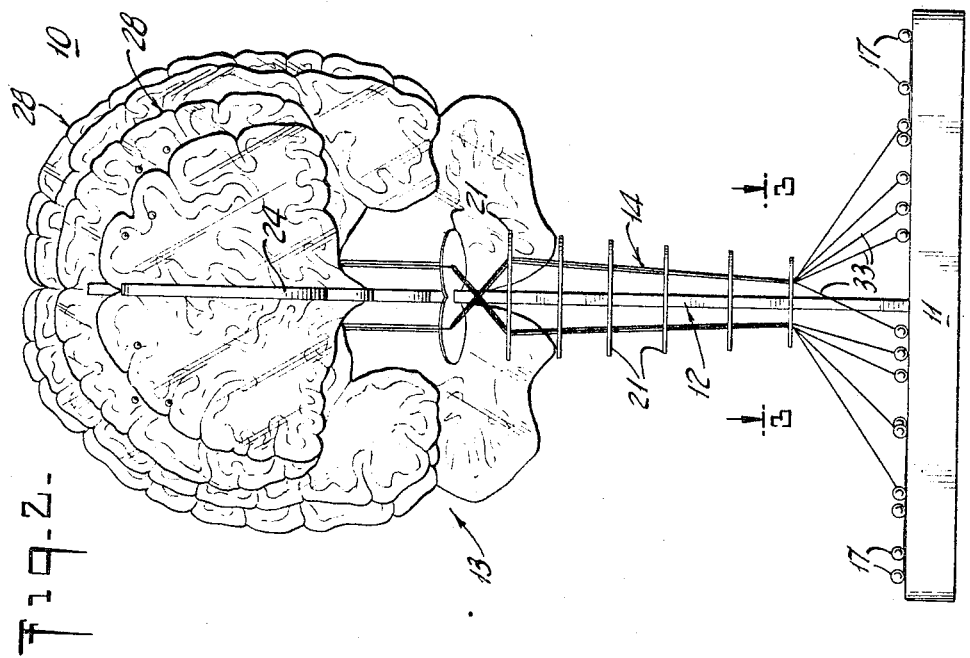
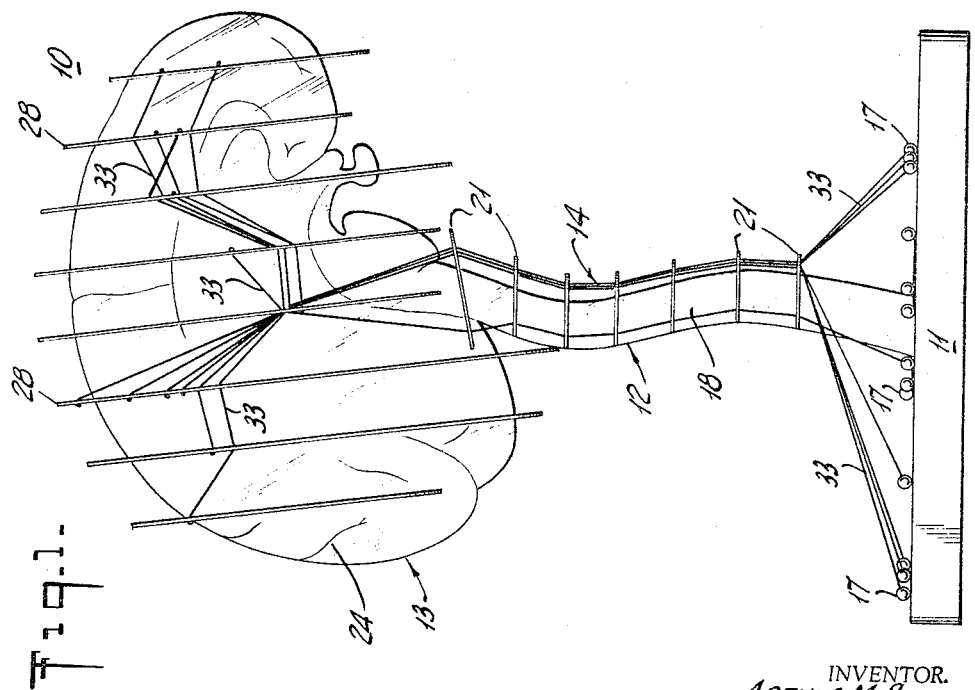
INVENTOR.
ARTHUR M. SACKLER
BY Stanley Woldar
ATTORNEY Sept. 13, 1966  A. M. SACKLER  3,271,879
BRAIN AND NERVOUS SYSTEM MODEL
Filed March 2, 1964  2 Sheets-Sheet 2
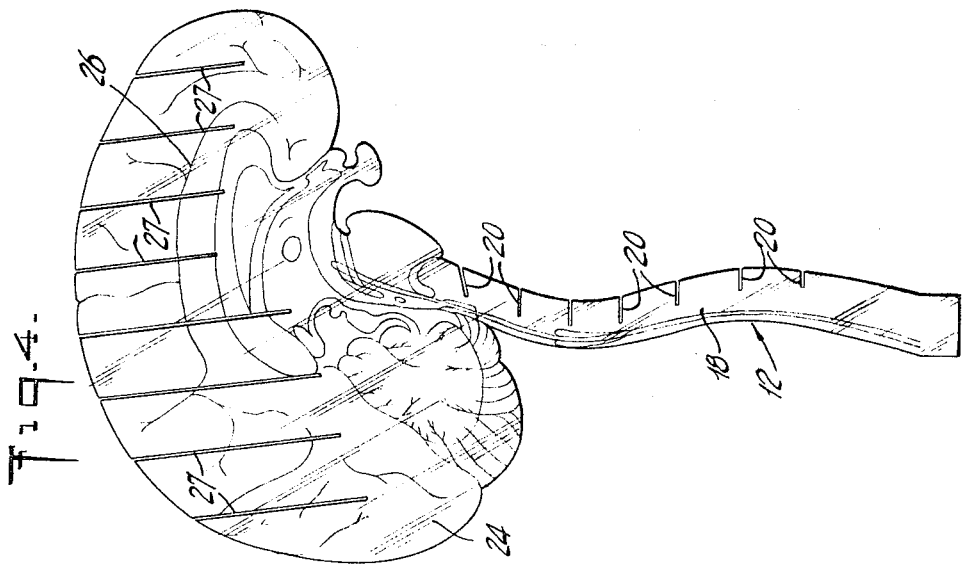
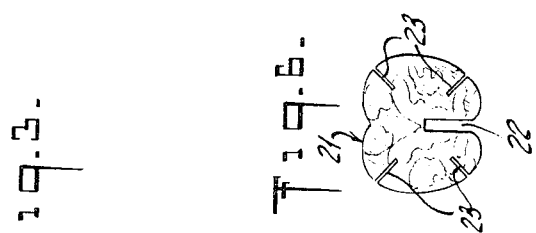
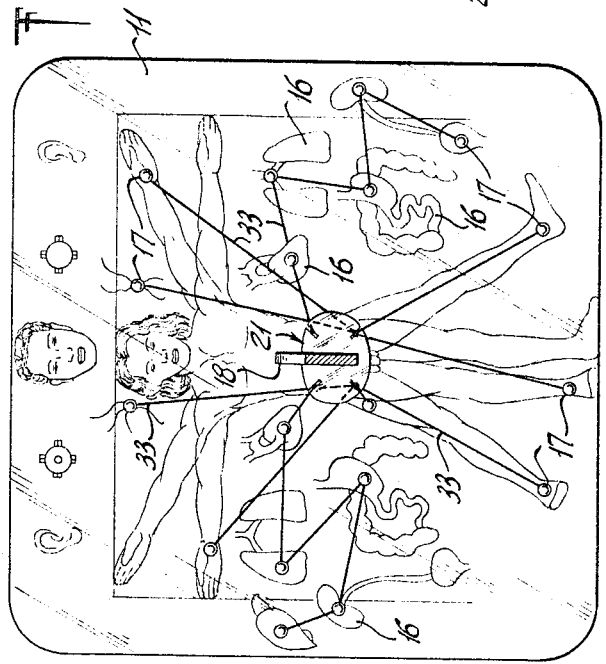
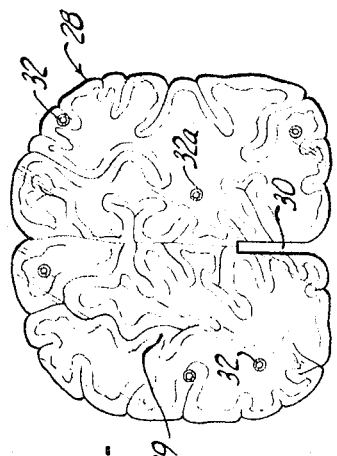
INVENTOR.
ARTHUR M. SACKLER
BY Stanley Wolder
ATTORNEY United States Patent Office 3,271,879
Patented Sept. 13, 1966

3,271,879
BRAIN AND NERVOUS SYSTEM MODEL
Arthur M. Sackler, 18 Searington Road,
Roslyn, Long Island, N.Y.
Filed Mar. 2, 1964, Ser. No. 348,573
16 Claims. (Cl. 35—17)

The present invention relates, generally to improvements in educational and display devices and it relates more particularly to an improved anatomical model of the brain and the nervous system which demonstrates the association of the various anatomical members and organs with related parts of the brain and the functional identity of the respective nerve tracts.

Many forms and types of anatomical models have been available and proposed for demonstrating the structure, relationship and association of various organs and members of the human body. While these anatomical model structures are suitable for numerous uses they possess many drawbacks and disadvantages when applied to the depiction of the brain and nervous system and their association and relationship with the various anatomical organs and members. The anatomical models of the brain and nervous system heretofore available are relatively complex, awkward, and expensive devices, generally difficult to interpret and comprehend; when simple they are limited in the amount of information they provide and otherwise leave much to be desired.

It is therefore a principal object of the present invention to provide an improved anatomical educational and display device.

Another object of the present invention is to provide an improved anatomical model which may be easily and rapidly assembled from the component parts thereof with a minimum of skill, thereby facilitating the distribution thereof in kit form.

Still another object of the present invention is to provide an improved anatomical model of the brain and the nervous system.

A further object of the present invention is to provide an improved three dimensional anatomical display device which affords a clear easily comprehensible demonstration of the brain and the various sections thereof, the nervous system and the association of different parts of the brain with related anatomical organs and members, and the functional identities of the respective nerve tracts.

Still a further object of the present invention is to provide an anatomical display device of the above nature characterized by its simplicity, ruggedness, low cost, attractive appearance, ease of assembly, and the large amount of accurate data and information easily available therefrom.

The above and other objects of the present invention will become apparent from a reading of the following description taken in conjunction with the accompanying drawing, wherein:

FIGURE 1 is a side elevational view of an anatomical display device embodying the present invention;

FIGURE 2 is a front elevational view thereof;

FIGURE 3 is a sectional view taken along line 3—3 in FIGURE 2;

FIGURE 4 is a front elevational view of the main longitudinal support panel;

FIGURE 5 is a plan view of one of the transverse brain section panels; and

FIGURE 6 is a plan view of one of the spinal cord transverse sections forming parts of the present display device.

In a sense the present invention contemplates the provision of an anatomical display device comprising a base carrying indicia corresponding to anatomical members, a brain model mounted on said base and including a plurality of longitudinally spaced panels carrying representations of corresponding brain sections, and nerve representing line elements extending from said indicia to respectively related points on said brain section representations.

According to a preferred form of the present device there is provided a longitudinally extending first panel shaped in accordance with the medial sagittal section of the brain and imprinted to depict said section. A narrow column coplanar with the first panel and depending therefrom is shaped to represent the sagittal section of the spinal cord and its bottom engages a corresponding well in the base member to support the first panel in an upright position. The first panel has a plurality of longitudinally spaced first slots formed in the upper part thereof, and longitudinally spaced second panels shaped and imprinted to represent corresponding coronal sections of the brain engage respective of the first slots and have vertical medial slots formed in their bottom sections which engage the lower section of the first panel. The column has vertically spaced horizontal slots formed therein each of which engages a horizontal panel shaped to represent a corresponding section of the spinal cord and radial slits are formed in each of the horizontal panels. The base indicia are pictures or schematic representations of various anatomical members and organs and strings extend from each of these members and organs, upwards through the slits in the horizontal panels and through respective openings in the transverse panels to terminate at predetermined areas in respectively associated panels. The strings are differently colored in accordance with their functional identities.

Referring now to the drawing which illustrates a preferred embodiment of the present invention, the reference numeral 10 generally designates the improved anatomical display device which includes a base member 11, a support column 12, a brain model member 13, and a nerve tract network or system 14. The base member 11 is preferably broad having a medially located narrow rectangular well formed in the top face thereof and is formed of any suitable material such as wood, metal and preferably a synthetic organic plastic resin.

The top face of the base member 11 carries a plurality of representations 16 of various anatomical organs and members of the human body as well as an overall picture of the human body, the various representations preferably being disposed in generally the true spatial relationship of the different organs to the body representation. The representations 16 may be two dimensional and printed on the top face of the base member 11 in any suitable manner or may be printed on a separate sheet or film which is laminated to the base member top face. The representations 16 may also be three dimensional and may be embossed or integrally molded on the top face of the base plate. A plurality of anchoring elements 17 in the form of pegs or the like are located on the top face of the base plate 11 in or adjacent to the area of each of the representations 16.

Directed upwardly from and firmly supported by the base plate 11 is a vertically extending, flat column 18, lying in a longitudinal plane and provided with a depending tongue 19 which snugly registers with the correspondingly shaped well formed in the base plate 11. The column 18 is of approximately the shape of the medial sagittal section of the spinal cord and has formed along its edge a plurality of vertically spaced substantially horizontal coupling slots 20 which extend to about the medial vertical axis of the column 18.

A plurality of vertically spaced horizontal plates 21 are supported along the length of the column 18 and are of approximately the shapes of the corresponding horizontal sections of the spinal cord. Each of the plates 21 has a coupling slot 22 formed therein extending to about the midpoint of the plate 21 and being of a width about equal to the thickness of the column 18. In the assembled condition each of the plate 21 engages a corresponding coupling slot 20 the respective coupling slot 22 engaging the aligned rear section of column 18. A plurality of front and rear laterally spaced radial coupling slits 23 are formed in each of the spinal cord plates 21. The column 18 and the plates 21 carry representations of the medial sagittal section and the corresponding horizontal sections of the spinal cord and these may be imprinted or otherwise applied to the column 18 and plates 21.

Mounted atop the column 18 and advantageously coplanar and formed integrally with the column 18 is a longitudinal vertical panel 24 having the peripheral shape of the medial sagittal section of the brain and carrying a representation 26 illustrating such sagittal section. The representation 26 may be highly detailed, showing the various parts of the brain in their true shape and disposition and these parts may be differently colored so as to be easily visually distinguishable. Among the parts which may be advantageously illustrated are the cerebrum, the cerebellum, the pons, the corpus collosum, the hypophesis etc. Formed along the upper edge of the panel 24 are a plurality of longitudinally spaced, parallel, forwardly downwardly inclined coupling slots 27 which extend from the panel upper edge to approximately the medial longitudinal axis of the panel 24.

While the column 18 and the panel 24 may be formed of any suitable material such as metal, wood, cardboard, or the like, they are advantageously integrally formed of a synthetic organic thermoplastic, preferably clear transparent resin, for example Lucite (polymethylmethacrylate), polystyrene, and other suitable resins and may be molded or shaped in any well known manner. The representations carried by the panel 24, column 18 and plates 21 may be directly applied to one or both faces thereof by any conventional procedure or sheets or films carrying these representations may be suitably laminated to these faces, the representation carrying sheets advantageously being of a clear transparent nature such as cellophane, Mylar, cellulose acetate or the like. As an alternative, representation carrying films or sheets may be sandwiched between similar pairs of clear transparent panels, columns and plates and the assemblies suitably secured into units as by cementing or such.

A plurality of longitudinally spaced, parallel, vertically extending transverse panels 28 is supported by the longitudinal panel 24, and projects laterally on opposite sides thereof. A transverse panel 28 registers with each of the slots 27 and has the peripheral shape of the corresponding coronal section of the brain and carries a representation 29 of such coronal section. The panel 28 may be formed of any of the materials which may form the panel 24 and like the panel 24 is preferably formed of a clear transparent synthetic organic resin. Moreover the representations 29 are applied to the panels 28 in any of the manners in which the representations 26 may be applied to the panel 24.

Formed in the bottom section of each of the panels 28 in a medial vertical slot 30 extending substantially to the midpoint of the panel and being of a width about equal to or slightly greater than the thickness of the panel 24. The upper section of each panel 28 in alignment with the slot 30 engages a corresponding slot 27 and the slot 30 engages the section of the panel below and in alignment with the corresponding slot 27. A plurality of apertures 32 are disposed at predetermined points in each of the panels 28 and define passageways and anchoring openings for the nerve defining lines. It should be noted that in the assembled condition of the coronal panels 28 and the sagittal panel 24 the corresponding representations of the brain coronal and sagittal sections are accurately related and associated as they are in the brain proper.

The nerve tract network 14 includes a plurality of elongated lines 33 which are advantageously multifilament or monofilament threads of natural or synthetic fibers. Each of the nerve tract defining lines 33 extends from one or more of the anchoring pegs 17 to which it is suitably secured, into engagement with a coupling slit 23 in the lowermost cord plate 21 and on the same side as the respective peg, thence upwardly through the vertically aligned slits 23 of the successive plates 21 until the next to the topmost plate 21. Thereafter the line 33 crosses laterally and passes through the transversely opposite slit of the topmost plate 21 and thence upwardly between the medial pair of coronal panels 28 and through passageway defining openings 32 and into engagement with a terminal opening 32. Opening 32 is surrounded by a colored area 32a to act as a guide in threading a line 33 of a given color therethrough. The end of the line 33 is secured to the respective terminal opening 32 in any suitable manner, such as by knotting the end of the line or wedging it into opening with a tapered peg or the like. Each of the lines 33 are connected in the above manner between an anatomical organ or member and the related or associated part of the brain.

The nerve lines 33 are advantageously of different colors to identify the functional nature or character of the represented nerve. Thus, by way of example, blue colored lines may represent the motor nerves, red colored lines the sympathetic nerves, green colored lines the association nerves, etc. Further, suitable indicia may be provided in association with the various openings 32 and representations 16 as a guide to the path of the respective nerve lines 33. In order to facilitate the lacing of the openings 32 with the nerve lines 33 narrow slits may be provided extending from the peripheral edges of the panels 28 into tangential communication with the upper peripheries of the openings 32.

The anatomical display device 10 presents a clear and accurate representation of the brain, as a complete unit, as well as the internal structure thereof as represented by accurately related easily visible sagittal and coronal sections, and the functional relationships of the various parts of the brain with the different anatomical organs and members. The demonstration of this relationship is effected in a true and accurate manner by the colored easily visible nerve lines extending from the various anatomical organs and members, along predetermined paths to associated parts of the brain in the manner of the corresponding nerve tract network in the human body proper. The anatomical device 10 is both highly attractive and informative. In addition, the device 10, by reason of its construction and the interfitting relationship of the various components may be marketed and distributed in a kit or disassembled form. The method of assembling and erecting the device 10 from the different parts is apparent and may be rapidly accomplished with a minimum of skill.

For example instead of one medial sagittal panel such as panel 24 there may be substituted or added two or any plurality of para-sagittal panels, i.e. parallel eccentric panels. Again, instead of portraying only the normal state, the set may be supplemented with coronal panels 28 and plates 21 (which may be inserted instead of those shown) which illustrate a diseased or abnormal state. Instead of the anchoring elements 17 (pins) there may be incorporated snap elements or other fastening devices. So too in order to keep lines 33 taut they may terminate in springs which in turn are secured to anchoring elements.

While there has been described and illustrated a preferred embodiment of the present invention it is apparent that numerous alterations, omissions and additions may be made without departing from the spirit thereof.

What is claimed is:

1. An anatomical display device comprising a base carrying indicia corresponding to anatomical members, a brain model mounted on said base and including a plurality of longitudinally spaced panels carrying representations of corresponding brain sections, and nerve representing line elements extending from said indicia to respectively related points on said brain section representations.

2. An anatomical display device comprising a base carrying first representations of anatomical members, a brain model mounted on said base and including a plurality of longitudinally spaced panels carrying second representations of corresponding coronal sections of the brain, and nerve representing line elements extending from said anatomical member representations to respectively related points on said brain section representations.

3. An anatomical display device comprising a base carrying first representations of anatomical members, a column projecting upwardly from said base member and representing the spinal cord, a brain model mounted atop said column and including a plurality of longitudinally spaced panels carrying a second representation of corresponding sections of the brain, and nerve representing line elements extending from said anatomical member representations to said column and along said column and to respectively related points on said brain section representations.

4. An anatomical display device comprising a base carrying first representations of anatomical members, a column projecting upwardly from said base and representing the spinal cord, a longitudinally extending first panel mounted atop said column, a plurality of longitudinally spaced second panels projecting transversely from said first panel and carrying representations of corresponding coronal sections of the brain, and a plurality of nerve representing line elements extending from said anatomical member representations to said column and along said column and to respectively related points on said brain section representations.

5. An anatomical display device comprising a base carrying first representations of anatomical members, a first longitudinally extending panel provided with and supported atop a depending substantially coplanar column mounted on said base and representing the medial sagittal section of a spinal cord, a plurality of horizontal sections supported by and vertically spaced along the length of said column, a plurality of longitudinally spaced second panels projecting transversely from said first panel and carrying representations of corresponding coronal sections of the brain, and a plurality of nerve representing line elements extending from said anatomical member representations along successive of said horizontal sections to respectively related points on said brain section representation.

6. An anatomical display device comprising a base carrying first representations of anatomical members, a first longitudinally extending panel carrying representations corresponding to the medial sagittal section of the brain and provided with and supported atop a depending substantially coplanar column mounted on said base and representing the medial sagittal section of a spinal cord, a plurality of horizontal plate members supported by and vertically spaced along the length of said column, a plurality of longitudinally spaced second panels projecting transversely from said first panel and carrying representations of corresponding coronal sections of the brain, and a plurality of nerve representing line elements extending from said anatomical member representations along successive of said horizontal plate members to respectively related points on said brain section representations.

7. The anatomical display device of claim 6 wherein said horizontal plate members comprise flat panels in the shape of corresponding horizontal sections of the spinal cord and have formed therein vertically aligned slots extending inwardly from the peripheries of said plate members, said line elements registering with respective aligned sets of said slots.

8. The anatomical display device of claim 7 wherein said column has vertically spaced horizontal first coupling slots formed therein and each of said plate members registers with a corresponding of said first coupling slots and has a second coupling slot formed therein engaging said column.

9. The anatomical display device of claim 6 wherein said first panel has formed therein longitudinally spaced first coupling slots extending from the top to points above the bottom thereof, said second panels separably registering with said first coupling slots and having formed therein second coupling slots extending from the bottom thereof to points below the top thereof and engaging said first panel.

10. The anatomical display device of claim 6 wherein said first and second panels have peripheral shapes corresponding to said brain sagittal and coronal sections respectively.

11. The anatomical display device of claim 6 wherein said first and second panels are separably connected.

12. The anatomical display device of claim 6 wherein said base has a well formed therein and said column separably engages said well.

13. The anatomical display device of claim 6 wherein second panels have openings formed therein and said line elements extend through said openings.

14. The anatomical display device of claim 6 wherein at least some of said line elements are of different colors.

15. The anatomical display device of claim 6, at least some of said line elements being of different colors and said plate members and said representations having areas, about the margins thereof wherein said line elements extend, colored to correspond to the colors of said elements.

16. The anatomical display device of claim 6 including anchoring means disposed on said base in registry with said anatomical member representations, said line elements, engaging preselected of said anchoring means.

References Cited by the Examiner

UNITED STATES PATENTS

| 1,951,422 | 3/1934 | Klemperer | 35—17 |
| 2,345,489 | 3/1944 | Lord | 35—17 |

FOREIGN PATENTS 248,012  1/1948  Switzerland.

EUGENE R. CAPOZIO, *Primary Examiner.*